Dec. 27, 1960 W. DIETRICH 2,966,624
CIRCUIT ARRANGEMENT FOR THE AUTOMATIC VOLTAGE REGULATION OF TELEVISION PICTURE TUBES
Filed Jan. 10, 1958
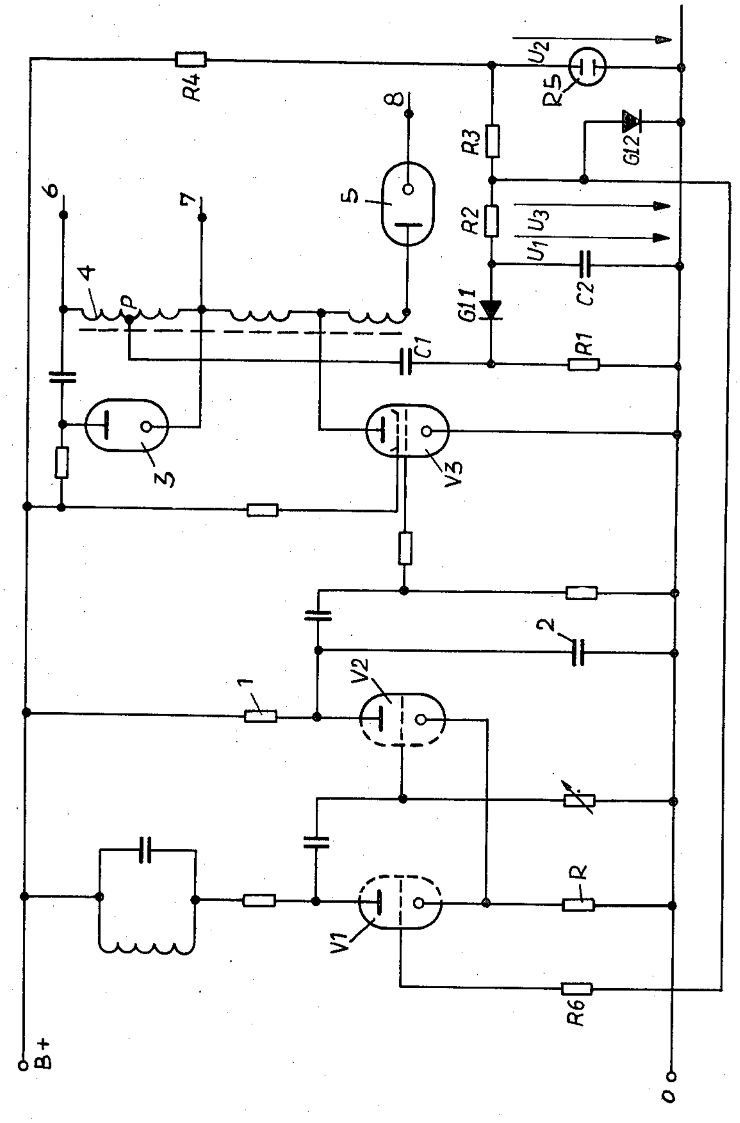
INVENTOR
W. Dietrich
BY [signature]
ATTORNEY United States Patent Office 2,966,624

Patented Dec. 27, 1960

2,966,624

CIRCUIT ARRANGEMENT FOR THE AUTOMATIC VOLTAGE REGULATION OF TELEVISION PICTURE TUBES

Walter Dietrich, Ditzingen, Wurttemberg, Germany, assignor to International Standard Electric Corporation, New York, N.Y., a corporation of Delaware Filed Jan. 10, 1958, Ser. No. 708,136

Claims priority, application Germany Jan. 25, 1957

3 Claims. (Cl. 321—18)

Object of the present invention is a simple circuit arrangement for automatically regulating the high voltage of picture tubes.

The circuit arrangement is particularly useful for dark-trace tubes (skiatrons) because in these tubes, as used for calibrated displays, the picture or pattern has to be sharper than with the conventional types of television picture tubes. To maintain good contrast or picture definition, after initial adjustment, under the varying operating conditions, such as fluctuations of the main voltage, variations of the properties of the line frequency generator, as well as the variations or modifications of the beam current intensity, it is necessary to keep the high voltage of the picture tube at a constant level.

A manual regulation calls for an additional operating manipulation and is not practicable in picture tubes employing a permanent magnet focusing system. It therefore is desirable to employ an automatic regulation.

It is already known to provide more favorable operating conditions for the power amplifier tube coupled to the flyback transformer by means of a voltage feed-back. This method chiefly serves the regulation of the tube properties. As a secondary effect this system provides a slight stabilization of the radio frequency voltage.

In accordance with another conventional method there is used a special tube for regulating and stabilizing the high voltage directly on the high voltage side. This tube is adjustable to the desired value, so that the basic brightness of the television images may be adjusted to a desired level. The employment of this tube, however, is rather expensive from the technical point of view.

The invention is particularly concerned with a circuit arrangement for the automatic regulation of the high voltage of picture tubes, in which there is derived from the pulse voltage of the flyback transformer a direct voltage, the magnitude of which is directly in proportion to the amplitude of the relaxation or sweep voltage and, consequently, of the high voltage. According to the invention there is provided a reference voltage of polarity opposite to the derived voltage, by means of which the derived voltage will be compensated to the value zero, as long as the pulse voltage of the flyback transformer and, consequently, the high voltage has its rated value.

According to a further idea of the invention this reference voltage is kept constant by means of a stabilizing circuit element, in the case of line variations. The regulating voltage is a very small one. It may be fed to the circuit arrangement at a suitable point, without having to redimension the system. Further, according to the invention, during the heating-up period of the tubes the control voltage is kept below a small positive value with the aid of a rectifier, so that the generator will be sure to be started but during operation this rectifier will be put out of operation by a small negative voltage.

This inventive arrangement has the advantage of being very reliable in operation without adding much cost and, in addition thereto, delivers a constant high voltage.

In the following the circuit arrangement and its mode of operation will be described in particular with reference to the drawing, the single figure of which is a circuit diagram embodying the invention.

In this drawing there is shown a part of the circuit which may be used to explain the invention. The relaxation oscillation generator is provided wherein the B+ voltage supply serves to charge a storage condenser 2 over resistor 1. Upon receipt of the horizontal synchronizing pulse, tube V2 is caused to operate, discharging the condenser 2 and terminating the generation of this saw-tooth sweep voltage. The saw-tooth voltage is applied over power amplifier V3 to the windings 4 of the sweep generator and the sweep voltage is produced at the output terminals 6 and 7. Upon termination of the saw-tooth sweep, the high voltage peak caused by the collapse of the field in the coil 4 may be rectified in the rectifier 5 and applied over terminal 8 to the second anode of the cathode ray tube. The usual ballast rectifier is shown at 3.

It will be noted that the cathode of tube V2 is coupled to the cathode of a regulating tube V1, and these cathodes are connected over a resistor R to the zero or reference voltage source. Tube V1 is so biased that it will conduct some current even when the grid is negative. Thus the voltage drop through resistor R caused by the flow of current through tube V1 will serve to bias the cathode of tube V2 regulating the amplitude of the sweep voltage and consequently the amplitude of the pulses produced in winding 4.

The invention contemplates using negative pulses tapped from winding 4 to produce a regulating voltage in cooperation with a reference voltage derived across R5 for supplying a control voltage to tube V1 to control the amplitude of the signal. A more complete explanation of the operation of the system will be obtained from the remainder detailed description of the operation of the circuit illustrated in the drawing.

The negative pulse voltage of the flyback transformer is taken off at a suitable tapping point, e.g. at point P from transformer winding 4, and is fed via a coupling condenser C1 to a resistor R1 and a rectifier G11.

Behind the rectifier is the smoothing condenser C2 across which a negative D.C. voltage $U_1$ is produced. This negative voltage is compared with the positive D.C.-voltage $U_2$ provided across voltage divider R4, R5. A second voltage divider consisting of the resistors R2 and R3 is so dimensioned that in the case of normal operating conditions the control voltage obtained by combining $U_1$ and $U_2$ will become $U_3=-1$ volt. The control voltage $U_3$ serves the regulation of the grid biasing potential of the tube V1 across a resistance R6, and by reducing the voltage drop in resistor R varies the voltage of the cathode of V2 and provides amplitude regulation of the pulse voltage produced in the relaxation generator.

If the pulse voltage at the flyback transformer increases then $U_1$ and $U_3$ will become more negative, thus also the control grid of the tube V1 causing a reduction of current through R, and the pulse voltage will be decreased. Owing to the fact that the high voltage is proportional to the pulse voltage, the high voltage will be kept constant in this way.

The reference or comparison voltage $U_2$ may be derived from a suitable D.C. voltage in the apparatus, as is denoted in the drawing e.g. by the voltage divider consisting of the resistors R4 and R5. If R5 were an ohmic resistance then the voltage $U_2$ would be changed in proportion with the operating voltage B+. The voltage $U_1$, however, will change only in proportion with the operating voltage. Thus there will be effected a regulation. However, preferably a glow lamp as shown, a varistor or a rectifier having a fixed voltage drop is used instead of an ohmic resistor.

Upon switching-on the apparatus the voltage $U_2$ will immediately assume its rated value, whereas $U_1=0$, because the tubes of the apparatus are still cold. Without rectifier G12, the voltage $U_3$, would grow to a high positive value and the relaxation generator would be prevented from being excited. However, the rectifier G12 effects that, as long as $U_1=0$, the voltage $U_3$ can only increase to a value equal to the drop across the rectifier, of say, +0.5 volt. Thus the relaxation generator is excited to a high amplitude and will then adjust itself in the already described manner to the proper working point.

If there is an added winding on the flyback transformer then C1 and R1 may be dispensed with, this winding having one end connected to 0 or reference potential and the other end to the anode of the rectifier G11.

What is claimed is:

1. A circuit for automatically controlling the high voltage supply of picture tubes comprising: a generator for generating a saw-tooth sweep voltage and having input and output circuits, a control circuit connected to said input circuit, a power amplifier connected to said output circuit, a flyback transformer connected to the output of said power amplifier, means connected to said transformer for deriving a direct current voltage of a predetermined polarity, means for providing a direct current reference voltage of opposite polarity and of a value substantially equal to said derived voltage during normal operation of said circuit with said high voltage at its rated value, means for combining algebraically said derived voltage and said reference voltage to produce a control voltage, means for applying said control voltage to said control circuit, and preventive means connected to said control circuit to prevent said control voltage from exceeding a value which would prevent said generator from generating said sweep voltage during the initial period of operation of said circuit.

2. A circuit according to claim 1 wherein said means providing a reference voltage comprises means for stabilizing said reference voltage against variation in supply voltage.

3. A circuit for automatically controlling the high voltage supply of picture tubes in accordance with claim 1, wherein said preventing means comprises a rectifier poled in the conductive direction during the initial period of operation of said circuit.

References Cited in the file of this patent

UNITED STATES PATENTS

| | | |
|---|---|---|
| 2,667,614 | Covill | Jan. 26, 1954 |
| 2,720,622 | Deuser | Oct. 11, 1955 |
| 2,806,988 | Sulpizio et al. | Sept. 17, 1957 |